United States Patent [19]

Boone et al.

[11] Patent Number: 4,724,170
[45] Date of Patent: Feb. 9, 1988

[54] APPARATUS AND METHOD FOR APPLYING CEMENT TO AN END PORTION OF A FLEXIBLE STRIP

[75] Inventors: Joe P. Boone, Lawton; John W. Lynch, Apache; Gary W. Sloan, Lawton, all of Okla.

[73] Assignee: The Goodyear Tire & Rubber Company, Akron, Ohio

[21] Appl. No.: 903,011

[22] Filed: Sep. 2, 1986

[51] Int. Cl.$^4$ .............................. B05D 5/10; B05C 1/02
[52] U.S. Cl. ..................................... 427/284; 427/428; 118/211; 118/223; 118/239; 118/262; 118/259; 118/210
[58] Field of Search ............... 427/284, 428; 118/223, 118/211, 210, 239, 259, 262, 221, 44, 244; 152/323; 156/123, 127, 128.1, 128.6

[56] References Cited

U.S. PATENT DOCUMENTS

| | | | |
|---|---|---|---|
| 1,147,161 | 7/1915 | Goldsmith | 118/239 |
| 1,775,080 | 9/1930 | Koleta | 156/516 |
| 2,331,342 | 10/1943 | Perry | 154/1 |
| 2,702,070 | 2/1955 | Lindemann | 154/42 |
| 3,146,159 | 8/1964 | Muggleton | 118/262 |
| 3,467,063 | 9/1969 | Brinkley et al. | 118/314 |
| 3,472,716 | 10/1969 | Sutherland | 156/128 |
| 3,688,735 | 9/1972 | Brenner | 118/243 X |
| 3,782,994 | 1/1974 | Doherty | 427/284 X |
| 4,151,038 | 4/1979 | Bottasso | 156/507 |
| 4,173,198 | 11/1979 | Allen | 118/314 X |
| 4,442,791 | 4/1984 | Adachi et al. | 427/284 X |
| 4,502,912 | 3/1985 | Steiner et al. | 156/548 |

FOREIGN PATENT DOCUMENTS 46-16272 3/1971 Japan ...................................... 118/244

Primary Examiner—John E. Kittle
Assistant Examiner—Alain Bashore
Attorney, Agent, or Firm—Frederick K. Lacher; T. P. Lewandowski

[57] ABSTRACT

The end portions of a flexible strip (46,48,50,52) are deflected from the path (54) of an automatic end cementer (10) along which the strip (46,48,50,52) is moved into engagement with cement appliers (62,94) spaced from the path (54). The weight of the unsupported leading end portion (92) causes the end (56) of the strip (46,48) to be deflected downwardly into contact with a cement applier (62) adjustably positioned below the path (54). The trailing end portion (58) is deflected upwardly by changing the direction of the path (54) for the strip (50,52) to lift the trailing end portion (58) from the path (54) into contact with a cement applier (94) adjustably positioned above the path (54).

10 Claims, 4 Drawing Figures

APPARATUS AND METHOD FOR APPLYING CEMENT TO AN END PORTION OF A FLEXIBLE STRIP

This invention relates generally to the handling of flexible strips such as tire treads and especially to the application of cement to the skived ends before the threads are assembled with the tire carcasses.

Heretofore it has been the practice to manually brush the cement on the skived ends of the tread after the tread is folded over. It has also been proposed to spray cement on one skived end surface while it is facing up and then turn the tread over on a conveyor to expose the other end surface which is sprayed with cement. The manual tread folding and brushing system has been costly because it requires substantial manpower. It has also required the bending of the tread which may distort the tread and affect the uniformity of tread thickness. The system of spraying one end with cement and then turning the tread over on a conveyor for spraying the other end with cement requires a substantial investment in conveying equipment and spray guns. There has also been a problem with maintaining the area round the spray guns which accumulates dust and dirt due to the cement mist in the air and on the surrounding equipment.

The present invention is directed to an apparatus and method requiring a minimum investment in equipment which automatically brushes cement on the skived ends of the tread. The cement is applied by rollers positioned at locations spaced from the path along which the read is conveyed. The support of the tread is altered to deflect the end portions of the flexible tread away from the path and into contact with the cement applying rolls. At all other times the cement applying rolls are out of contact with the intervening portions of the tread. Adjustments are provided to compensate for the stiffness variations associated with different tread contours, compounds and temperatures.

In accordance with one aspect of the invention there is provided an apparatus for applying cement to an end portion of a strip of flexible material without applying the cement to an intervening portion between the ends of the strip comprising a conveyor system for supporting and moving the strip longitudinally in a predetermined path, a cement applier located at a position spaced from the path for movement of the strip along the path and past the cement applier, a support altering means in the conveyor system at a position adjacent the cement applier for altering the weight distribution of the strip causing the end portion of the strip to be moved away from the path into contact with the cement applier, and a conveyor portion downstream from the support altering means for carrying the strip away from the cement applier after application of the cement to the end portion without further contact of the strip with the cement applier.

In accordance with another aspect of the invention there is provided a method of applying cement to an end portion of a strip of flexible material without applying cement to an intervening portion between the ends of the strip comprising the steps of (a) moving the strip along a path in a longitudinal direction;
(b) locating a cement applier at a position spaced from the path for movement of the strip past the cement applier without contact of the cement applier with the intervening portion;
(c) altering the support of the strip at a position adjacent the cement applier so that the weight of the strip causes the end portion to be deflected away from the path into contact with the cement applier for applying cement to the end portion of the strip; and
(d) continuing to move the strip along the path and out of contact with the cement applier after application of the cement.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
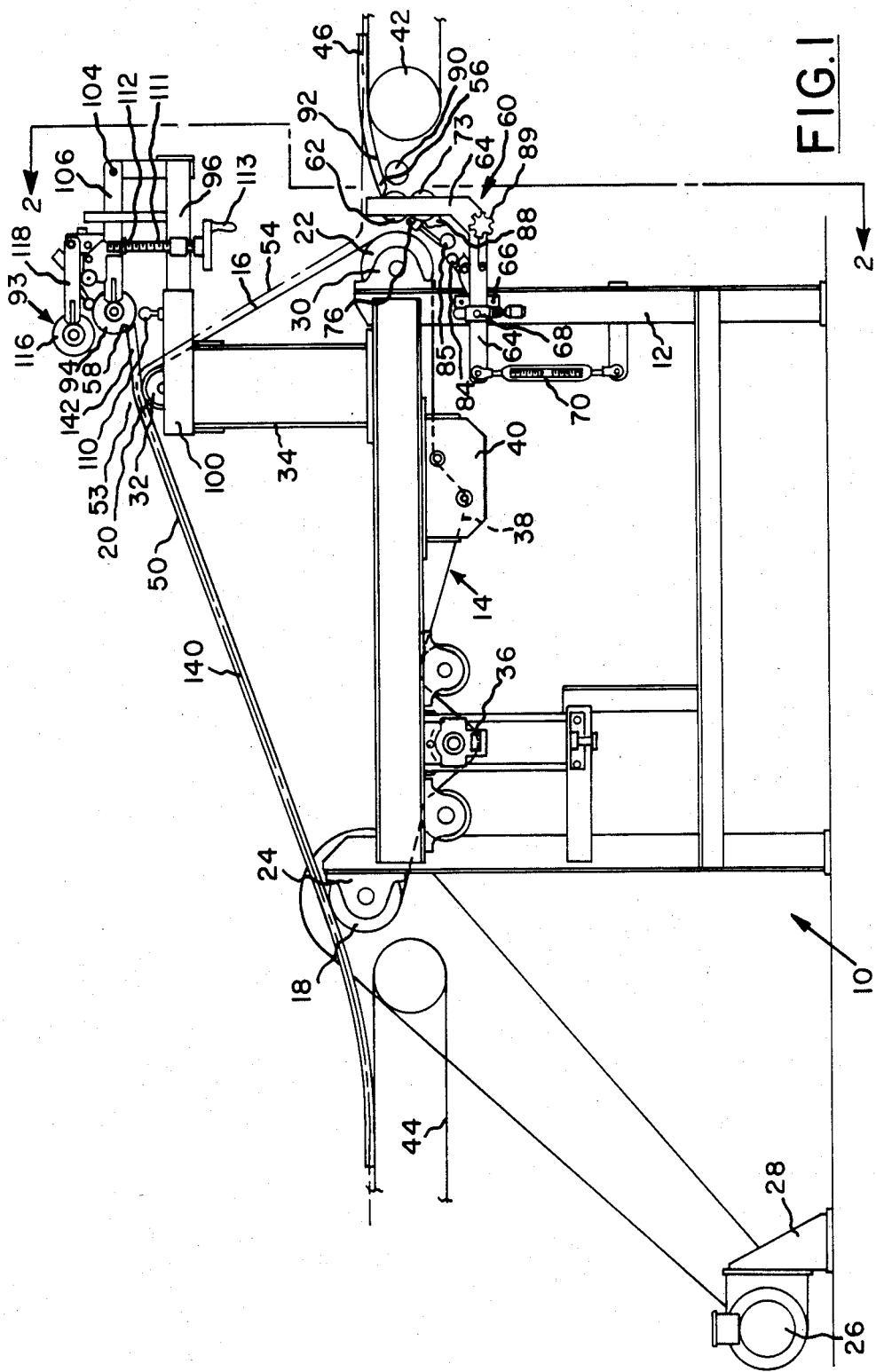
FIG. 1 is an elevation of the apparatus of this invention showing two pairs of treads with cement being applied tot he leading ends of one pair of treads and cement being applied to the trailing ends of the other pair of treads with the tread path being illustrated by a dot-dash line.
Figure 2:
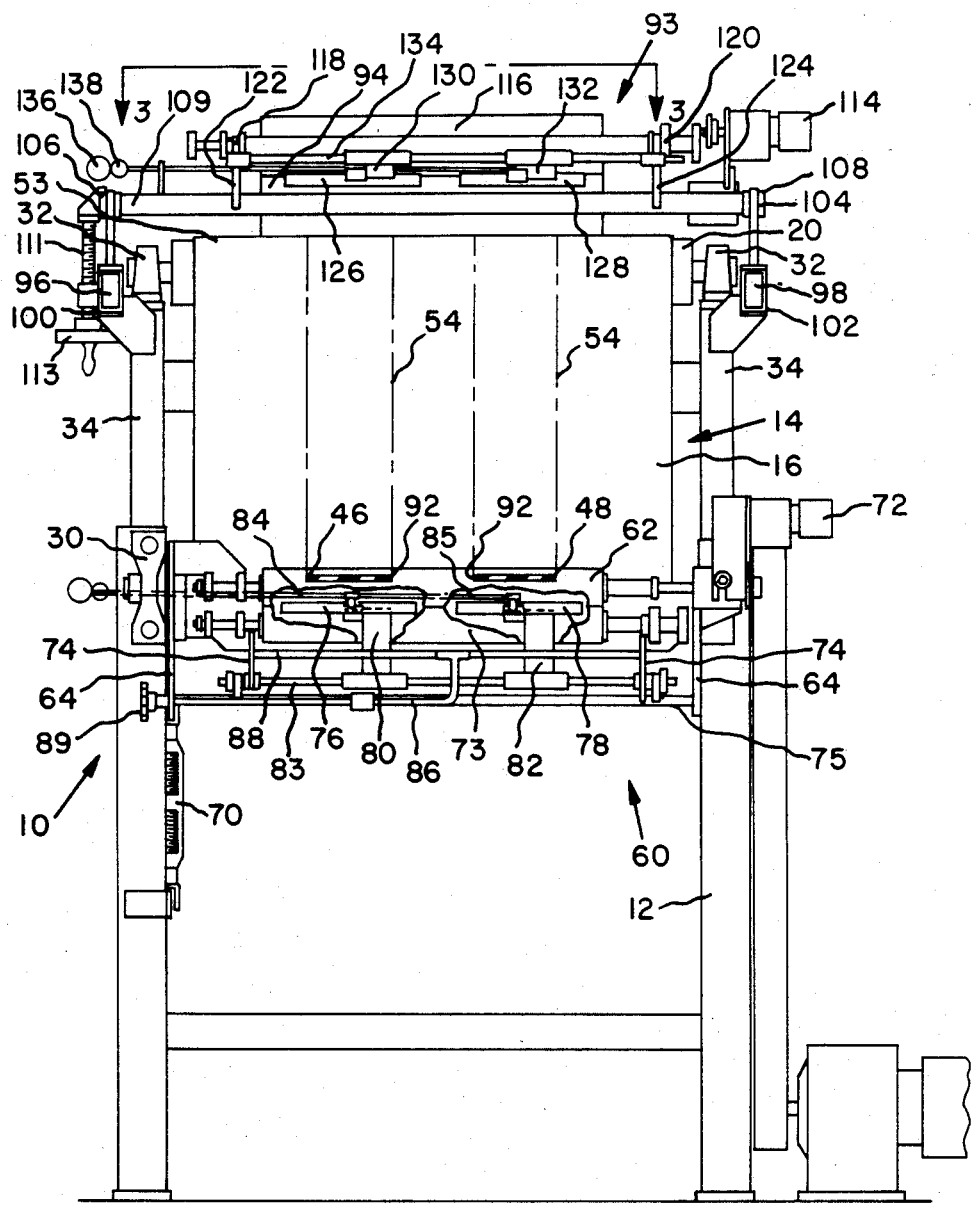
FIG. 2 is an end view taken along line 2—2 in FIG. 1 with parts being broken away to show the lower cement applier.
Figure 3:
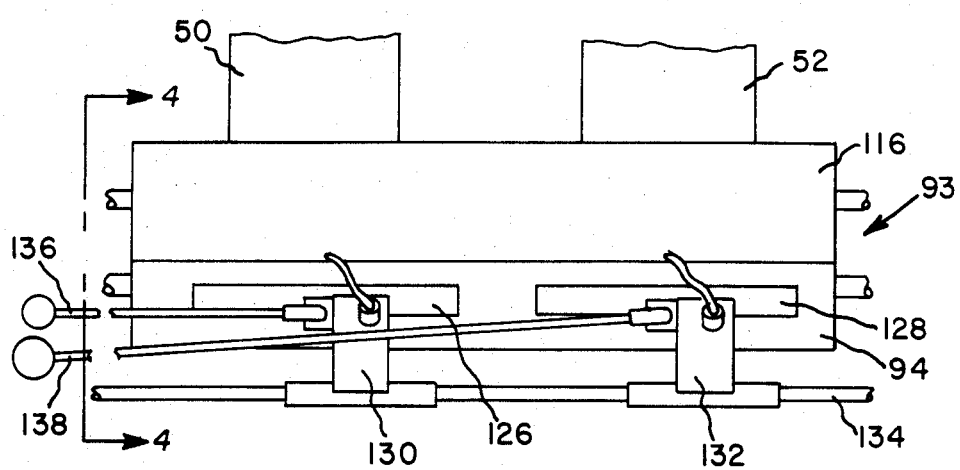
FIG. 3 is an enlarged fragmentary view of the upper cement applier.
Figure 4:
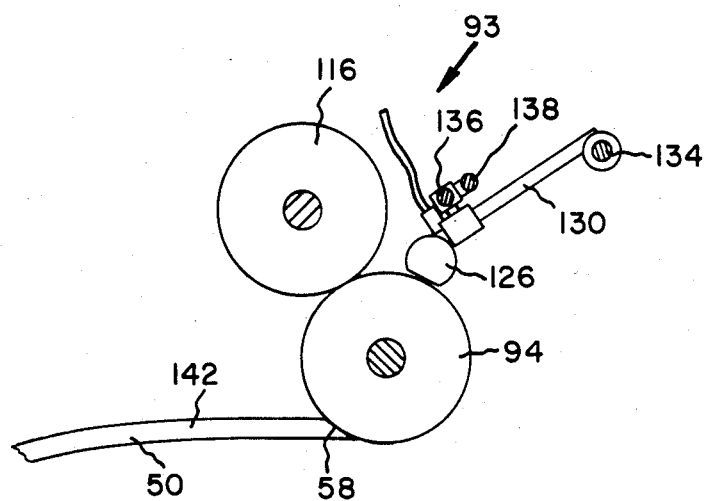
FIG. 4 is an enlarged fragmentary side view of the upper cement applier taken along line 4—4 in FIG. 3.

Referring to FIGS. 1 and 2, an automatic end cementer 10 is shown having a main frame 12 for supporting a conveyor system 14.

The conveyor system 14 includes a conveyor belt 16, a drive roll 18, an upper idler roll 20 and a lower idler roll 22. The drive roll 18 is rotatably supported on pillow blocks 24 fastened to the main frame 12 and connected by a chain or other suitable means (not shown) to a drive motor and reducer 26 supported on a drive base 28. The lower idler roll 22 is supported by pillow blocks 30 mounted on the main frame 12 and the upper idler roll 20 is supported on pillow blocks 32 mounted on pedestals 34 fastened to the main frame at each side of the automatic end cementer 10. The conveyor system 14 also includes a takeup 36 mounted on the main frame 12 and a belt guide 38 supported by belt guide brackets 40 mounted on the main frame.

A feed conveyor 42 schematically shown in FIG. 1 is positioned adjacent to but spaced from the lower idler roll 22. An exit conveyor 44 schematically shown in FIG. 1 is positioned adjacent to the drive roll 18. The feed conveyor 42 is usually part of an existing tread line which may have a width of from 30 inches (76.2 cm) to 42 inches (106.68 cm) for conveying a first pair of treads 46 and 48 in side-by-side relationship to the automatic end cementer 10. A second pair of treads 50 and 52 are shown extending from an apex 53 of the belt 16 to the exit conveyor 44. A normal path 54 for the treads 46, 48, 50 and 52 is shown in dot-dash lines. the drive motor and reducer 26 may be a variable speed DC motor for sychronizing the speed of the conveyor belt 16 with the speed of the feed conveyor 42. To avoid the possibility of jamming, the speed of the conveyor belt 16 is preferably faster than the speed of the feed conveyor 42. This may be at a speed of from 70 to 100 feet (21.34 to 30.48 m) per minute, depending upon the rate at which the treads are cut.

The treads 46, 48, 50 and 52 are of a flexible material and have skived leading ends 56 which may be cut at an angle of about 20 degrees. The treads 46, 48, 50 and 52 also have skived trailing ends 58 inclined at an opposite angle of 20 degrees to the skived leading ends 56 so that when the treads are wrapped around the tire carcass, the skived ends will be joined and cemented together.

Referring again to FIGS. 1 and 2, a leading end cement applier 60 is shown positioned between the exit end of the feed conveyor 42 and the entry end of the conveyor system 14. An entry applier roll 62 is rotatably mounted on brackets 64 supported on clamp blocks 66 mounted on the main frame 12. The brackets 64 are adjustably supported on the clamp blocks 66 by means of an adjusting block 68 and turnbuckle 70 for positioning the entry applier roll 62 for engagement by the leading ends 56 of the treads 46 and 48 as shown in FIG. 1. An air motor 72 mounted on one of the brackets 64 is connected by suitable means to the entry applier roll 62 for driving the roll in a counterclockwise direction as shown in FIG. 1.

An entry idler roll 73 is mounted on arms 74 hinged to a tubular beam 75 extending between the brackets 64 with the roll surface of the idler roll in close proximity to the roll surface of the entry applier roll 62 for spreading cement uniformly across the surface of the applier roll. Manifolds 76 and 78 carried by arms 80 and 82 are slidably mounted on a manifold support shaft 83 carried by the tubular beam 75.

Positioning rods 84 and 85 are connected to the manifolds 76 and 78, respectively, for sliding the arms 80 and 82 to desired positions over the path 54 of the treads 46 and 48. A control rod 86 connected to an entry idler roll adjusting rod 88 has a knob 89 for controlling the position of the entry idler roller on the entry applier roll 62.

The manifolds 76 and 78 are connected to a cement handling system (not shown) for supplying cement to the entry applier roll 62, as needed. Between the feed conveyor 42 and the entry applier roll 62, a carryover roll 90 may be provided, if necessary, and may be mounted on the feed conveyor 42 or the main frame 12.

As shown in FIG. 1, the leading ends 56 of the treads 46 and 48 are conveyed by the feed conveyor 42 into an area where the support of the treads is altered by spacing the exit end of the feed conveyor 42 from the entry end of the conveyor system 14 so that the weight of leading end portions 92 of the treads 46 and 48 will deflect the leading end portions below the path 54 and engage the entry applier roll 62 which is positioned below the paths. Then after the cement is applied to the skived leading ends 56, the leading end portions 92 are propelled toward the conveyor belt 16 at the idler roll 22 and carried along the belt toward the upper idler roll 20 so that the treads 46 and 48 will follow the path 54 and not make contact with the entry applier roll 62.

As shown in FIGS. 1, 2, 3 and 4, and exit end cement applier 93 is shown positioned above the upper idler roll 20. An exit applier roll 94 of the exit end cement applier 93 is adjustably mounted on the pedestals 34 by means of arms 96 and 98 slidably supported in boxbeams 100 and 102 mounted on the pedestals. The arms 96 and 98 have pivotal connections 104 to a pair of exit applier roll beams 106 and 108 connected by a tubular beam 109 for carrying the exit applier roll 94. Adjustment of the exit applier roll 94 is provided by thumbscrews 110 threaded in the boxbeams 100 and 102 for engaging the arms 96 and 98 plus a screw jack 111 mounted on the arm 96 and having a bearing pad 112 in lifting engagement with the beam 106. A hand wheel 113 may be rotated to lift or lower the exit applier roll 94. An airmotor 114 may be mounted on the roll beam 108 and be connected to the exit applier roll 94 for rotating the roll in a counterclockwise direction as shown in FIG. 1.

An exit idler roll 116 is mounted on arms 118 and 120 hingedly connected to exit idler roll brackets 122 and 124 mounted on the tubular beam 109. The weight of the exit idler roll 94 for spreading the cement along the surface of the exit applier roll.

Manifolds 126 and 128 carried by arms 130 and 132 are slidably mounted on a manifold support shaft 134 carried by the tubular beam 109. Positioning rods 136 and 138 are connected to the manifolds 126 and 128, respectively, for sliding the arms 130 and 132 to desired positions over the path 54 of the treads 50 and 52. The manifolds 126 and 128 are connected to the cement handling system for supplying cement to the exit applier roll 94 as needed.

As shown in FIG. 1 the skived trailing ends 58 are conveyed between the lower idler roll 22 and the upper idler roll 20 of the conveyor system 14 along the path 54 while intervening portions 140 are conveyed into an area where the support of the treads 50 and 52 is altered by changing the direction of the path from a sloping upward direction to a sloping downward direction. In the embodiment shown, the first portion of the conveyor system 14 between the lower idler roll 22 and the upper idler roll 20 is inclined at an angle of about 60 degrees to the horizontal. A second portion of the conveyor system 14 between the upper idler roll 20 and the drive roll 18 is inclined at an angle of about 20 degrees to the horizontal. Due to the stiffness of the treads 50 and 52, trailing end portions 142 are lifted from the conveyor belt 16 and deflected above the path 54 urging the trailing ends 58 into engagement with the exit applier roll 94 which is positioned above the path. Then after the cement is applied to the skived trailing ends 58, the trailing end portions 142 are carried along the belt 16 to the exit conveyor 44.

Where the treads 50 and 52 are of a stiffer material, it may be desirable to adjust the position of the exit idler roll 94 by moving the beams 96 and 98 away from the pedestal after unscrewing the thumbscrews 110 and then tightening the screws at the new position. Also the height of the exit idler roll 94 may be adjusted upwardly or downwardly with the screw jack 111 by rotating the handwheel 113.

In the automatic end cementer shown, the conveyor belt 16 is of a type which resists coating by the cement and can be easily cleaned. A spring loaded cement pickup roll (not shown) may be provided to clean the excess cement from the surface of the belt 16. The entry applier roll 62, entry idler roll 73, exit applier roll 94 and exit idler roll 116 are preferably foam rollers for applying and spreading the cement to the skived leading ends 56 and skived trailing ends 58.

Suitable cement handling handling systems (not shown) may be provided. In the present embodiment, the cement handling system consists of a 1:1 ratio air driven pump, a fluid pressure regulator and four air-actuated dispenser metering valves. The pump transfers cement from a holding tank to the system and maintains fluid pressure to the fluid pressure regulator. The fluid pressure regulator steps down the fluil pressure and maintains the fluid pressure to each of the four dispenser valves. Each dispenser valve is connected to one of the manifolds 76, 78, 126 and 128. When actuated the valves open and cement flows into the bite of each pair of exit rolls 94, 116 and entry foam rolls 62 and 73.

An air purge system may be provided to clear any obstructions such as dried cement from the row of holes in each of the cement manifolds 76, 78, 126 and 128. Toggle valves may be provided which, when manually depressed, admit regulated air pressure to the cement lines that feed the individual manifolds 76, 78, 126 and 128. Check valves may also be used in the air and cement lines to prevent air or cement flow in the wrong direction.

A suitable control system may be used to control the frequency at which the cement dispenser valves are opened and the duration they are open each cycle. An electronic control system may be provided wherein the frequency is determined by operator adjusted thumbwheel switches. With this system cement may be applied to the entry applier roll 62 for approximately three seconds after evey thirtieth tread 46, 48, 50 and 52 passes by the unit. Cement may also be applied to the exit applier roll 94 for approximately three seconds after every sixtieth tread 46, 48, 50 and 52 passes by. The upper and lower control system may be independent and the frequency of each application can be regulated over a substantial range. Treads 46, 48, 50 and 52 passing along the path 54 may be monitored by a photoeye (not shown) mounted to view the treads in a direction horizontally across the conveyor belt 16. Manual controls may also be used to open specific dispenser valves where necessary such as applying cement to newly installed entry and exit applier rolls 62, and 94.

While a certain representative embodiment and details have been shown for the purpose of illustrating the invention, it will be apparent to those skilled in the art that various changes and modifications may be made therein without departing from the spirit or scope of the invention.

What is claimed is:

1. A method of applying cement to a leading end portion of a strip of flexible material without applying cement to an intervening portion between the ends of said strip comprising the steps of:
  (a) moving said strip along a path in a longitudinal direction;
  (b) locating a cement applier at a position spaced from said path for movement of said strip past said cement applier without contact of said cement applier with said intervening portion;
  (c) changing the support of said strip along said path at a position adjacent said cement applier so that an unsupported weight of a leading end portion of said strip causes said leading end portion to be deflected and extend below said path nd engage said cement applier positioned below said path for applying cement to said leading end portion of said strip; and
  (d) continuing to move said strip along said path and out of contact with said cement applier after application of said cement.

2. The method of claim 1 including the conveying of said leading end portion on a first conveyor which terminates at a position adjacent said cement applier providing said cement applier with a roller for rotatably applying said cement to said leading end portion and propelling said leading end portion to a second position beyond said cement applier, and providing a second conveyor at said second position for receiving said leading end portion and conveying said strip in said path after application of said cement by said cement applier.

3. The method of claim 2 including applying cement to at a trailing end portion of said strip comprising the additional steps of:
  (a) supporting and moving said strip on said second conveyor from a lower position upwardly at an inclination to the horizontal to an apex position;
  (b) moving said strip upwardly beyond said apex position at said inclination in an unsupported condition until the weight of the unsupported portion of said strip causes said strip to fall against a portion of said second conveyor inclined downwardly from said apex position at an inclination to the horizontal; and
  (c) continuing to move said strip over said apex position causing said trailing end portion to be lifted into engagement with an exit cement applier positioned over said path at said apex position.

4. A method of applying cement to a trailing end portion of a strip of flexible material without applying cement to an intervening portion between the ends of said strip comprising the steps of:
  (a) supporting and moving said strip along a path in a longitudinal direciton on a conveyor from a lower position upwardly at an inclination to the horizontal to an apex position;
  (b) locating a cement applier at a position over said path at said apex position for movement of said strip past said cement applier without contact of said cement applier with said intervening portion;
  (c) moving said strip upwardly beyond said apex position at said inclination in an unsupported condition until an unsupported weight of the unsupported portion of said strip causes said strip to fall against a portion of said conveyor inclined downwardly from said apex position at an inclination to the horizontal;
  (d) continuing to move said strip over said apex position whereby an unsupported weight of said trailing end portion of said strip is not sufficient to maintain said trailing end portion in said path and said trailing end portion is lifted into engagement with said cement applier; and
  (e) continuing to move said strip along said path and out of contact with said cement applier after application of said cement.

5. An automatic end cementer for applying cement to an end portion of a strip of flexible material without applying said cement to an intervening portion between the ends of said strip comprising a conveyor system for supporting and moving said strip longitudinally in a predetermined path, said conveyor system including a first conveyor which is a generally horizontal driven belt feed conveyor and a second conveyor which is an inclined driven belt conveyor, a cement applier located at a position spaced from said path for movement of said strip along said path and past said cement applier, a support alteration means in said conveyor system at a position adjacent said cement applier for altering an unsupported weight distribution of said strip causing said end portion of said strip to be moved away from said path into contact with said cement applier, said support alteration means being interposed between an exit end of said first conveyor and an entry end of said second conveyor, said support alteration means comprising spacing of said exit end of said first conveyor from said entry end of said second conveyor; a conveyor portion downstream from said support alteration means for carrying said strip away from said cement applier after application of said cement to said end portion without further contact of said strip with said cement applier; said cement applier comprising an entry cement applier positioned below said exit end of said first conveyor and between said exit end of said first conveyor and said entry end of said second conveyor and said entry cement applier further comprising a driven roller for rotation in the same direction as the movement of said strip for transferring said end portion to said second conveyor.

6. The automatic end cementer of claim 5 wherein said second conveyor includes a first inclined portion inclined to the horizontal for conveying said strip from a lower position to an upper position, a second portion of said second conveyor for carrying said strip away from said upper position and said support alteration means further including inclining said second inclined portion of said second conveyor of said conveyor system at a different angle to the horizontal than said first inclined portion is inclined causing a trailing end portion of said strip to lift off said first inclined portion as an unsupported weight of said strip is transferred from said first inclined portion to said second inclined portion whereby an exit cement applier is engaged by said trailing end for applying cement to said trailing end.

7. The automatic end cementer of claim 6 wherein said entry cement applier includes an entry applier roll adjustably mounted for movement toward and away from said path, an entry idler roll mounted below said entry applier roll with a roll surface in close proximity to the roll surface of said entry applier roll, a cement applying manifold positioned over said entry applier roll for applying cement to said entry applier roll surface and drive means for rotating said entry applier roll in the same direction as the movement of said strip along said path and for rotating said entry idler roll to spread the cement evenly on said entry applier roll surface.

8. The automatic end cementer of claim 6 wherein said exit cement applier is located above said upper position of said second conveyor and includes an exit applier roll adjustably mounted for movement toward and away from said path, an exit idler roll mounted above said exit applier roll with a roll surface in close proximity to the roll surface of said exit applier roll, a cement applying manifold positioned over said exit applier roll for applying cement to said exit applier roll surface, drive means for rotating said exit applier roll in a direction opposite to the direction of movement of said strip along said path and for rotating said exit idler roll to spread the cement evenly on said exit applier roll surface.

9. An automatic end cementer for applying cement to a trailing end portion of a strip of flexible material without applying said cement to an intervening portion between the ends of said strip comprising a conveyor system for supporting and moving said strip longitudinally in a predetermined path, said conveyor system including a first inclined portion inclined to the horizontal for conveying said strip from a lower position to an upper position of said conveyor system, a second inclined portion of said conveyor system for conveying said strip away from said upper position, a cement applier located at a position spaced from said path for movement of said strip along said path and past said cement applier, a support alteration means in said conveyor system at a position adjacent said cement applier, said support alteration means including inclining said second inclined portion of said conveyor system at a different angle to the horizontal than said first inclined portion is inclined causing a trailing end portion of said strip to lift off said first inclined portion as an unsupported weight of said strip is transferred from said first inclined portion to said second inclined portion whereby said cement applier is engaged by said trailing end portion for applying said cement, and said second inclined portion carrying said strip away from said cement applier after application of said cement to said trailing end portion without further contact of said strip with said cement applier.

10. The automatic end cementer of claim 9 wherein said first inclined portion of said conveyor system is inclined at an angle of about 60 degrees to the horizontal and said second inclined portion is inclined at an angle of about 20 degrees to the horizontal.

* * * * *